Figure 1:
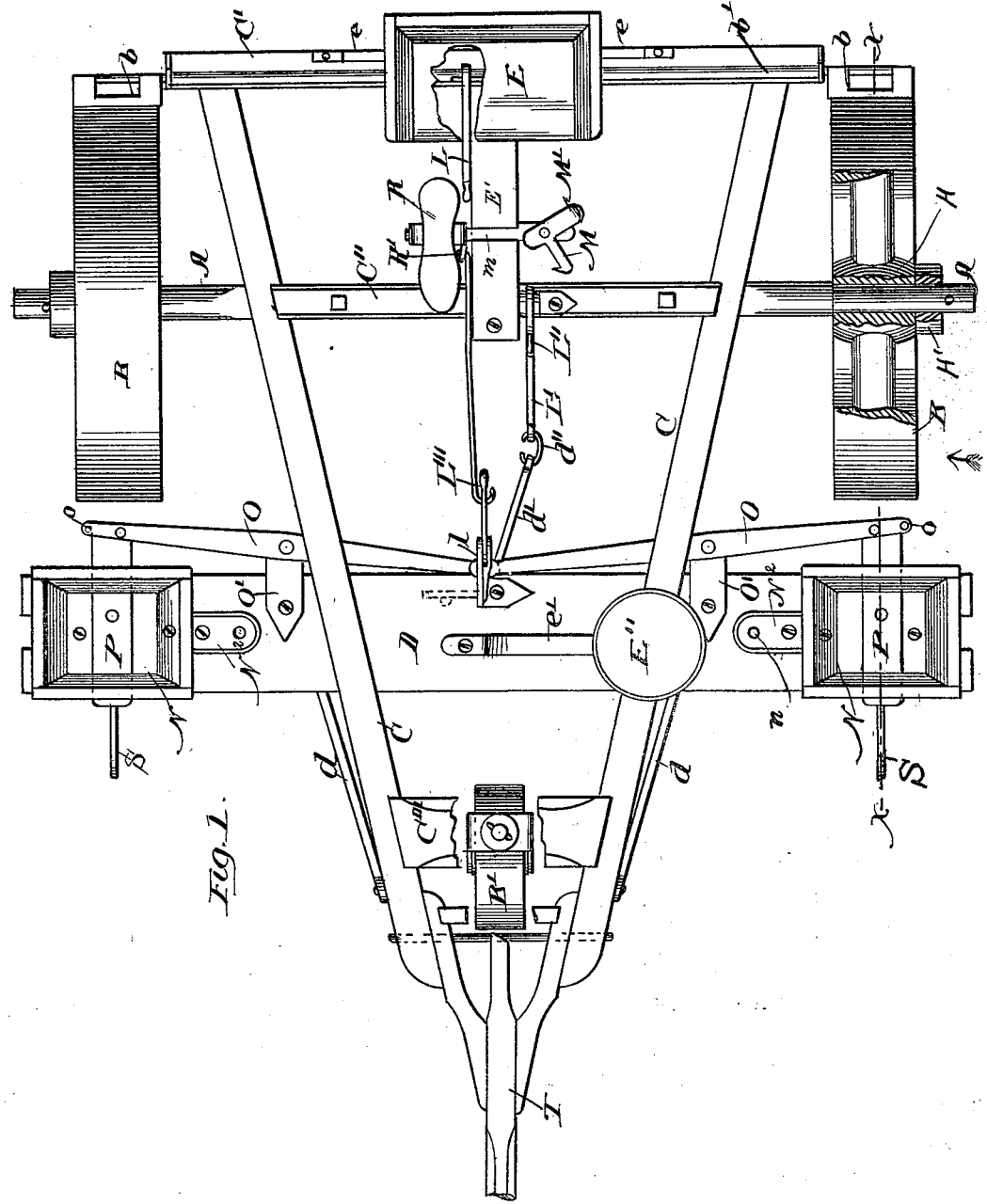

(No Model.) 2 Sheets—Sheet 1.

G. D. FREDERICK.
CORN PLANTER.

No. 515,329. Patented Feb. 27, 1894.

Witnesses:
Chas. O. Shervey.
H Bitner

Inventor:
George D. Frederick
By Niles & Greene
Attys

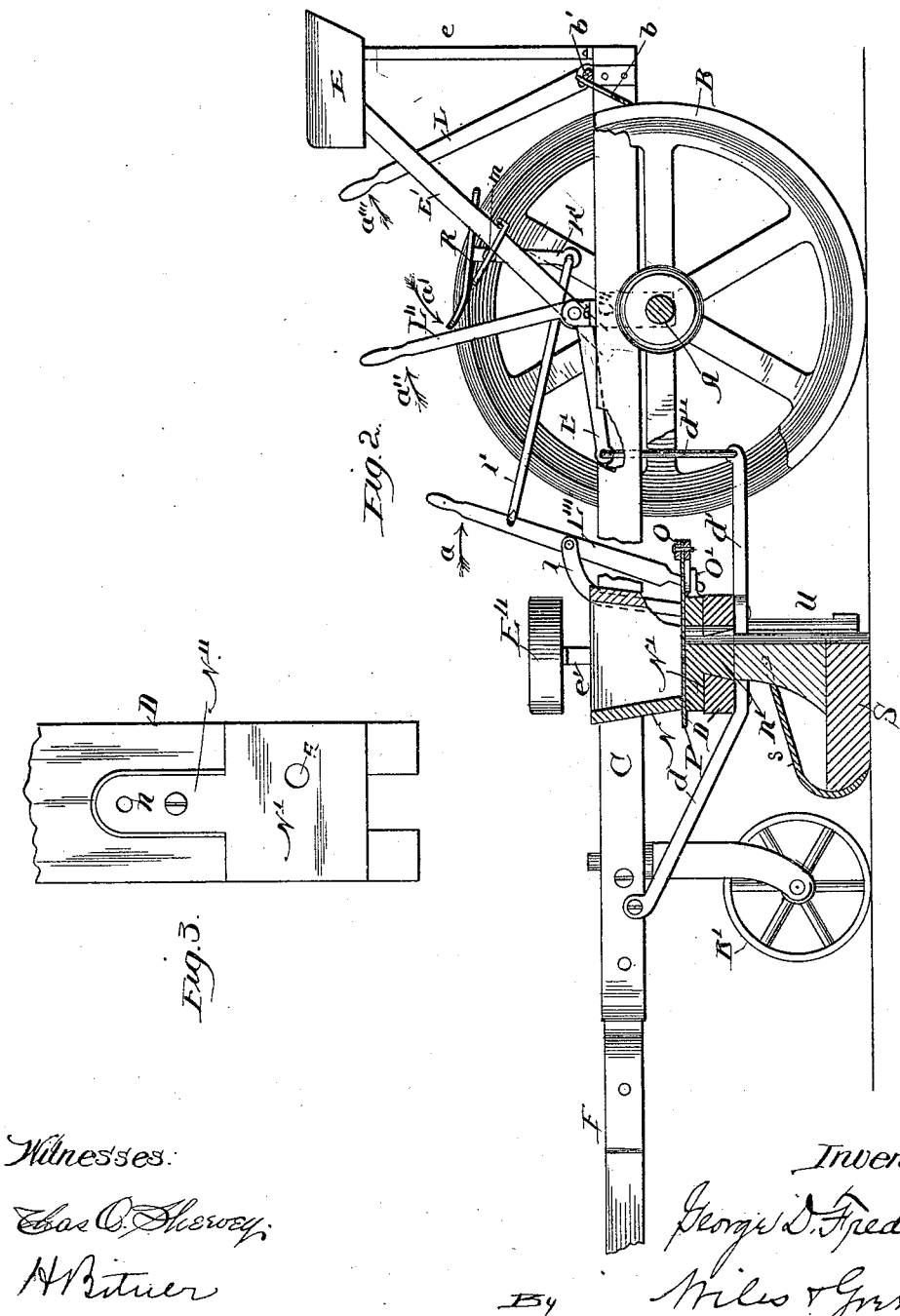

UNITED STATES PATENT OFFICE.

GEORGE D. FREDERICK, OF CLARNO, WISCONSIN.

CORN-PLANTER.

SPECIFICATION forming part of Letters Patent No. 515,329, dated February 27, 1894.

Application filed March 4, 1891. Renewed August 2, 1893. Serial No. 482,203. (No model.)

*To all whom it may concern:*

Be it known that I, GEORGE D. FREDERICK, a resident of Clarno, in the county of Green and State of Wisconsin, have invented certain new and useful Improvements in Corn-Planters; and I do hereby declare the following to be a full, clear, and exact description of the invention, such as will enable others skilled in the art to which it pertains to make and use the same.

My invention relates to improvements in corn planters of that class in which the dropping mechanism is moved by a lever controlled by an operator on the machine.

The invention is fully described, explained and claimed in this specification and shown in the accompanying drawings, in which—

Figure 1 is a top plan of a corn planter embodying my invention. Fig. 2 is a vertical section through the line $x-x$ of Fig. 1; the view being in the direction indicated by the arrow in said figure; and Fig. 3 is a top plan of the bottom of one of the hoppers of the dropping mechanism.

In the views A is the axle of a corn planter, and B, B, are wheels mounted upon and supporting the axle in the ordinary manner. Upon the axle, A, rests a frame made up of two side timbers, C, C, converging from rear to front, and three parallel cross timbers, C', $C^2$, $C^3$, rigidly connecting the side timbers, the central cross timbers, $C^2$, being rigidly secured to the axle, A, and the front cross timber, $C^3$, being supported by a caster wheel, B', whose vertical shank is journaled in the cross timber. A tongue, T, is secured between the front ends of the side timbers, C, C, by a horizontal pivot, and serves as a means for drawing the planter but not for supporting any part of its weight.

Beneath the frame, and about midway between the front end thereof and the axle, is a cross timber, D, supported by shoes, S, connected with it in the manner hereinafter set forth, the cross timber being connected with the frame by straps or links, $d$, fastened to it and pivoted at their front ends to the side timbers, C, C, of the frame. An operator's seat, $E^2$, is supported on the cross timber, D, by a standard, $e'$, and a driver's seat, E, is supported above the cross timber, C', by means of an oblique standard, E', resting on the cross timber, $C^2$, and braces, $e$, resting on the cross timber, C'. On each end of the cross timber, D, rests a seed hopper, N, the bottom, N', of the hopper being formed with an extension, $N^2$, extending inward toward the center of the timber, and the extension being pierced by two or more bolt holes, $n$, whereby the hopper may be longitudinally adjusted on the cross bar and fastened in positions corresponding in number to the holes, $n$. On the lower face of the bottom, N', is formed a dovetail tongue, $n'$, fitting in a corresponding longitudinal slot in the cross bar, D, and serving to hold the hopper in line, and, in connection with a bolt passing through one of the holes, $n$, to hold the hopper in position on the cross timber.

Each of the shoes, S, S, heretofore referred to, is rigidly fastened to the corresponding tongue, $n'$, and thus adjusted with the hoppers, and is always in the same relation to the dropping mechanism situated therein. Through each of the hoppers, and in contact with the bottom thereof, passes a dropping slide, P, free to move in a line at right angles with the cross timber, D, or parallel to the central line from front to rear of the machine. The rear end of each of the slides, P, is pivotally connected with the outer end of one of two horizontally reciprocating levers, O, each of said levers being pivoted at its center to a support, O', fastened to the cross timber, D, and the inner ends of the two levers being overlapped at the center of the machine. The outer end of each of the levers, O, is pierced by two or more bolt holes, $o$, corresponding in relative positions to the bolt holes, $n$, in the extension, N', of the bottom of the hopper, the bolt holes, $o$, being necessary to permit the pivoting of the free end of each of the levers, O, to the corresponding slide, P, in any of the positions in which the hoppers, N, may be secured upon the cross timber, D. An approximately vertical hand lever, $L^3$, is centrally pivoted upon the upper end of a support, $l$, fastened to the cross timber, D, near its center, said lever being free to oscillate in a plane at right angles to the cross timber, and its lower end being passed through openings in the overlapping inner ends of the levers, O. It is evident that the backward movement of the upper end of the lever, $L^3$, as indicated by the arrow, $a$, Fig. 2, will move the slides, P, from rear to front, and thus bring the opening in each of the slides into a position corresponding with the opening in the bottom of the corresponding hopper, and permit the dropping of a portion of the grain in the hopper; and as the lever is within easy reach of the operator's seat upon the cross timber, D, a man seated thereon may operate the lever and the dropping mechanism.

Upon the standard, E', which supports the driver's seat, is rigidly fastened a transverse bar, $m$, upon one of whose projecting ends is pivoted a foot-rest, R, rigidly connected with a dependent lever, R', whose lower end is connected with the lever, $L^3$, by means of a link, $l'$. The foot-rest, R, is so placed as to be readily operated by the foot of the driver on the driver's seat, E, and it is evident that the downward movement of the front end of the foot-rest, as indicated by the arrow, $a'$, Fig. 2, will move the upper end of the lever, $L^3$, in the direction indicated by the arrow, $a$, and operate the dropping mechanism in the manner already described.

When the planter is not in use, but is moving from place to place, it is important to provide it with means for lifting the shoes, S, above the ground, and for this purpose a rearwardly projecting bar, $d'$, is rigidly fastened to the cross timber, D, the rear end of the bar being connected by means of an approximately vertical link, $d^2$, with the front end of the horizontal member, L', of a bell crank lever pivoted in supports on the cross timber, $C^2$, the upper end of the vertical member, $L^2$, of the lever being within reach of the driver's seat. The backward movement of the free end of the lever, $L^2$, as indicated by the arrow, $a^2$, Fig. 2, raises the link, $d^2$, and bar, $d'$, and lifts the cross timber, D, and the parts supported by it. When the cross timber is thus raised, its weight, together with that of the parts attached to it, is supported by the main frame of the planter, and this in turn is supported wholly by the wheels, B, B', no part of it being transmitted by the tongue to the team. When the lever, $L^2$, has been thrown back for the purpose of raising the cross timber, D, it may be secured and held in position as long as desired, by means of a hook, M, formed in a single piece, with a foot-rest, M', and pivoted to the projecting end of the bar, $m$, whose opposite end supports the foot-rest, R, as hereinbefore set forth. When the planter is in motion, whether the dropping mechanism be in use or not, it is necessary that the wheels be kept free from adhering earth, and for this purpose two scrapers, $b, b$, are fastened to the ends of a suitably journaled rod, $b'$, supported by the cross timber, C', and operated by means of a lever, L, whose lower end is rigidly fastened to the rod, while its upper end lies in front of the driver's seat. The backward motion of the free end of this lever, as indicated by the arrow, $a^3$, Fig. 2, throws the scrapers against the wheels, B, B, and the opposite movement of the lever withdraws them from contact therewith.

Each of the wheels, B, has a hub, H, whose inner end rests ordinarily against a shoulder formed on the axle: and a washer, H', encircles the axle and is in contact with the outer end of the hub, the washer and hub being held in place by a suitable pin, such as is shown in Fig. 1, or by other means.

As it is desirable that the wheel may always run immediately behind the dropping mechanism and may cover the furrow formed by the shoe, it is necessary to adjust the wheels upon the axle to correspond with the adjustment of the dropping devices. This adjustment of the wheels is effected by placing each of the washers, H', between the corresponding hub and the shoulder on the axle, and thus increasing the distance between the wheels.

In order that the dropping mechanism may be operated by either hand of the operator, the support, $e'$, of the operator's seat, $E^2$, is pivoted to the timber, D, and may thus be swung into a position opposite to that in which it is shown in Fig. 1.

Each of the shoes, S, is preferably provided with an oblique guard, $s$, adapted to prevent the clogging of the shoe with grass, sticks, or other loose matter lying on the ground over which the planter passes.

Having now described and explained my invention, what I claim as new, and desire to secure by Letters Patent, is—

1. The combination with the frame, of the cross timber beneath the same supported only by forwardly extending links pivoted to the frame and a rearwardly extending arm connected by a link with a bent operating lever at the rear of the machine, hoppers and shoes integrally, or rigidly connected by a tongue fitting a dove-tail slot in said cross timber; whereby the hoppers, shoes and their operating mechanism may be raised by a single motion, and the entire lateral adjustment of all parts may be made by moving the tongue in the slot.

2. The combination with the main frame and its supporting wheels, of the cross timber, D, linked to the main frame, the hoppers, N, each having a bottom, N', provided with a tongue, $n'$, sliding in a corresponding slot in the cross timber whereby the hoppers may be longitudinally adjusted on the timber, the slides, P, lying in the hoppers and susceptible of sliding movement therein, the levers, O, centrally pivoted to the cross timber, and pivoted at their outer ends to the slides, P, and the lever, $L^3$, pivoted at its center to a stationary support, and at its lower end to the inner ends of the levers, O, whereby the movement of the lever, $L^3$, operates the levers, O, and the slides, P, the outer end of each of the levers, O, being provided with a number of perforations, o, whereby the lever may be connected with the corresponding slide, P, in any position of the hoppers and slides; substantially as and for the purpose set forth.

In testimony whereof I have signed this specification in the presence of two subscribing witnesses.

GEORGE D. FREDERICK.

Witnesses:
J. A. CRAIN,
R. H. WILES.